US011207830B2

(12) United States Patent
Gilan et al.

(10) Patent No.: US 11,207,830 B2
(45) Date of Patent: Dec. 28, 2021

(54) METHODS FOR NEGATIVE 3D PRINTING MACHINE AT HIGH RESOLUTION

(71) Applicant: IO Tech Group Ltd., London (GB)

(72) Inventors: Ziv Gilan, Kfar-harif (IL); Michael Zenou, Hashmonaim (IL); Guy Nesher, Nes Ziona (IL)

(73) Assignee: IO Tech Group Ltd., London (GB)

( * ) Notice: Subject to any disclaimer, the term of this patent is extended or adjusted under 35 U.S.C. 154(b) by 0 days.

(21) Appl. No.: 17/248,220

(22) Filed: Jan. 14, 2021

(65) Prior Publication Data

US 2021/0347116 A1 Nov. 11, 2021

Related U.S. Application Data

(60) Provisional application No. 62/704,446, filed on May 11, 2020.

(51) Int. Cl.
| | |
|---|---|
| *B29C 64/194* | (2017.01) |
| *B29C 64/129* | (2017.01) |
| *B29C 35/08* | (2006.01) |
| *B29C 64/357* | (2017.01) |
| *B33Y 30/00* | (2015.01) |
| *B33Y 10/00* | (2015.01) |

(Continued)

(52) U.S. Cl.
CPC ........ *B29C 64/194* (2017.08); *B29C 35/0805* (2013.01); *B29C 64/112* (2017.08); *B29C 64/129* (2017.08); *B29C 64/357* (2017.08); *B29C 2035/0827* (2013.01); *B33Y 10/00* (2014.12); *B33Y 30/00* (2014.12); *B33Y 40/20* (2020.01)

(58) Field of Classification Search
None
See application file for complete search history.

(56) References Cited

U.S. PATENT DOCUMENTS

| | | | | |
|---|---|---|---|---|
| 5,192,559 A | * | 3/1993 | Hull | ...................... B29C 64/188 |
| | | | | 425/89 |
| 5,216,616 A | * | 6/1993 | Masters | .................. B29C 35/08 |
| | | | | 264/401 |

(Continued)

FOREIGN PATENT DOCUMENTS

WO 2014/126837 A2 8/2014

OTHER PUBLICATIONS

International Search Report and Written Opinion dated Apr. 21, 2021, from the ISA/European Patent Office, for International Patent Application No. PCT/IB2021/050276 (filed Jan. 15, 2021), 11 pgs.

*Primary Examiner* — Matthew J Daniels
*Assistant Examiner* — Paul Spiel
(74) *Attorney, Agent, or Firm* — Ascenda Law Group, PC

(57) ABSTRACT

Methods and apparatus for the fabrication of solid three-dimensional objects from liquid polymerizable materials at high resolution. A material is coated on a film non-digitally, excess material is removed digitally, by laser, leaving an image of a layer to be printed, and the image is then engaged with existing portions of an object being fabricated and exposed to a non-digital UV curing light source. Since the only part of the process that is digital is the material removal, and this part is done by laser, the speed of printing and the robustness of the manufacturing process is improved significantly over conventional additive or 3D fabrication techniques.

10 Claims, 25 Drawing Sheets

(51) Int. Cl.
*B29C 64/112* (2017.01)
*B33Y 40/20* (2020.01)

(56) References Cited

U.S. PATENT DOCUMENTS

| | | |
|---|---|---|
| 5,236,637 A | 8/1993 | Hull |
| 7,438,846 B2 | 10/2008 | John |
| 7,892,474 B2 | 2/2011 | Shkolnik et al. |
| 9,636,873 B2 | 5/2017 | Joyce |
| 2018/0015502 A1* | 1/2018 | Zenou ................ G02B 6/3598 |
| 2018/0043619 A1* | 2/2018 | Kim ..................... B29C 64/129 |
| 2019/0263054 A1 | 8/2019 | Kotler et al. |
| 2020/0238624 A1* | 7/2020 | Dubelman ............ B29C 64/124 |
| 2020/0307095 A1* | 10/2020 | Daniels ................ B29C 64/147 |

\* cited by examiner

METHODS FOR NEGATIVE 3D PRINTING MACHINE AT HIGH RESOLUTION

RELATED APPLICATIONS

This is a NONPROVISIONAL of, claims priority to, and incorporates by reference U.S. Provisional Application No. 62/704,446, filed 11 May 2020.

FIELD OF THE INVENTION

The present invention concerns methods and apparatus for the fabrication of solid three-dimensional objects from liquid polymerizable materials at high resolution.

BACKGROUND

In conventional additive or three-dimensional fabrication techniques, construction of a three-dimensional object is performed in a layer-by-layer manner. Layer formation is performed through solidification of photo-curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An example of such a technique is given in Hull, U.S. Pat. No. 5,236,637. A disadvantage of such "top down" techniques is the need to submerge the growing object in a deep pool of liquid resin and reconstitute a precise overlayer of liquid resin before a next layer of the object can be formed.

If new layers are formed at the bottom of the growing object, then after each irradiation step the object under construction must be separated from the bottom plate in the fabrication well. An example of such a technique is given in Hull, U.S. Pat. No. 5,236,637. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches employ a sliding build plate, for example as shown in U.S. Pat. No. 9,636,873. Such approaches introduce a mechanical step that may complicate the apparatus, slow the method, and/or potentially distort the product.

Continuous processes for producing a three-dimensional object are suggested at some length with respect to "top down" techniques in U.S. Pat. No. 7,892,474, and the best approach to this date is offered by WO 2014/126837. There, an interface between the first and second layers or zones of the same polymerizable liquid are formed. The first layer or zone (sometimes also referred to as a "dead zone") contains an inhibitor of polymerization (at least in a polymerization-inhibiting amount); in the second layer or zone the inhibitor has been consumed (or has not otherwise been incorporated or penetrated therein) to the point where polymerization is no longer substantially inhibited. The first and second zones do not form a strict interface between one another but rather there is a gradient of composition that can also be described as forming an interphase between them as opposed to a sharp interface, as the phases are miscible with one another, and further create a (partially or fully overlapping) gradient of polymerization therebetween (and also between the three-dimensional object being fabricated, and the build surface through which the polymerizable liquid is irradiated).

Although promising, this technique has several limitations. First, it can be used only for one material formulation at a time, limiting dramatically the physical properties of an article that can be produced by this technique. Second, the rate of production is limited by the inhibitor used, the viscosity of the liquid phase, and the UV light source power. Further, the article is still immersed in a resin bath and it needs to be cleaned at the end of the process to remove residuals.

SUMMARY OF THE INVENTION

Given the above-described limitations with current additive or three-dimensional ("3D") fabrication techniques, the current invention provides a much faster way to produce a three-dimensional article by creating the next layer of the article being fabricated on a film at a high resolution and exposing it to a corresponding light source during contact between the film and previously formed portions of the article, to produce the formed article's next layer. Since this is a continuous sequence production process, the rate of object formation and its versatility are improved over that of other techniques. Multiple materials can be introduced at each layer and no cleaning is needed at the end of the production process.

In one embodiment, a new method for 3D printing that reduces waste and enhances the speed of manufacturing is provided. A material is coated on a film non digitally, excess material is removed digitally, by laser, and a full image is then engaged with existing portions of the object being fabricated (also referred to herein as a "sample") and exposed to a non-digital UV curing light source. Since the only part of digitizing is the material removal, and this part is done by laser, the speed of printing and the robustness of the manufacturing process is improved significantly over conventional additive or 3D fabrication techniques.

Among the materials that are most appropriate for the present approach are high viscosity materials that will not move between a material jetting unit and a sample building unit, however, any material can be used while taking into account that as the material viscosity is reduced, the final resolution of the sample undergoing production is reduced as well.

One embodiment of a negative 3D printing system configured in accordance with the present invention includes a coating system based on film and rollers, a laser jetting system that is positioned on top of a material reuse unit, and a sample building unit in which the film comes into contact with a sample during UV curing. Another optional unit is a sample release unit, which may operate using mechanical, chemical, or optical (e.g., laser) means, or any combination of these approaches.

The coating system may be implemented in any of several fashions. For example, in one embodiment the coating system may include a syringe with a film forming unit in which a coated film passes between two rollers. Other coating approaches that can be used include traditional screen printing, dispenser unit(s) printing, micro gravure coating, slot die coating, inkjet printing, or roller coating.

The coating can be done in a controlled environment, e.g., to prevent evaporation of solvent or oxidation and to minimize material waste for later reuse, and in some embodiments implemented in a closed loop in which the material being coated on the film passes through a reuse unit with small additions of material to previously unused portions thereof per cycle.

The coating system can, in some cases, support multiple material 3D printing.

The negative digital laser jetting system may include a pulsed laser with enough energy to jet the negative image of the material from the film surface. Among possible lasers that can be employed for such a purpose are infrared (IR) lasers, ultraviolet (UV) lasers, carbon dioxide ($CO_2$) lasers, etc.

The film that is used for transferring the material should be a transparent film, at least one that is transparent (or nearly so) to the wavelength of the laser being used, with or without a coating on the film. Examples of the transparent films that can be used are polyethylene terephthalate (PET), biaxially-oriented polypropylene (BOPP), polyimide (PI), etc.

The coat of the film is used to enhance jetting of the material from the film to the material reuse system. To that end, a metal or other polymer coat with additives that adsorb at the laser wavelength and create transparent areas digitally with exposure to the laser negative jetting system can be used.

As mentioned above, the materials portfolio that can be used for 3D printing with the present system is very wide and a detailed listing of all of the possible materials is impractical. By way of example, possible materials can be UV/visible-light cured material formulations with UV-cured monomers and polymers, viscose or sensitive materials, acrylates, epoxies, urethanes, adhesives, pastes, etc., and UV-cured monomers and polymers with additives such as ceramics, metals, organic additives, fiber reinforcement, etc., or UV-cured waxes.

The system can be used for low or high viscosity materials that are cured or partially cured by light and may also be used for materials that are cured by heat such as ceramic and metal pastes, solder pastes (epoxy-based or urethane-based), or silicone family materials with or without UV-curable ends. Reactions can advance by light, by heat, or by other catalyst (Pt, OH, etc.), or combinations of these mechanisms.

The system can be used also for highly sensitive material 3D printing, for example, 3D printing of bio-compatible materials. It could also be used for 3D printing of thermoplastic materials at room temperature or at elevated temperatures (with some adjustments).

The curing system used in embodiments of the system is not a digital process and, therefore, a border range of curing means can be employed. For example, UV or visible light curing system can be used as can IR or other heat curing systems (as post treatments). It is also possible to use chemically latent catalysts for the curing reaction.

As one example, a basic UV formulation can use monomers and polymers like acrylate, epoxy, urethane, and other UV or light sensitive materials with light sensitive initiators or/and co-initiators or sensitizers, such as, acetophenones, thioxanthones, phosphine oxides, iodonium and sulfonium salts, etc.

The configuration of the sample release system may be dependent on the chemistry of the film, may involve some laser ablation or cleaning of the top surface after curing, and/or may be a mechanical system. Any of several approaches can be used, for example, a system that provides a low angle release towards a Y-axis (e.g., by moving the film at small angle away from the sample), or a system that provides two Z-axes, one for a frame (holding the film) and one for the sample, or a system that provides an acoustic vibration to release the film from the sample.

These and other embodiments of the invention are described in detail below.

BRIEF DESCRIPTION OF THE DRAWINGS

The present invention is illustrated by way of example, and not limitation, in the figures of the accompanying drawings, in which:

FIGS. 3a-3m illustrate aspects of a process in accordance with an embodiment of the present invention, including negative jetting of a material (FIG. 3a-3c) with optional initial curing (FIG. 3d), sample contact (FIG. 3e-3f), curing (FIG. 3g), a release process (FIG. 3h-3j), sample surface cleaning (FIG. 3k), and the overall result and structure (FIG. 3l-3m).

DESCRIPTION OF THE INVENTION

Figure 1:
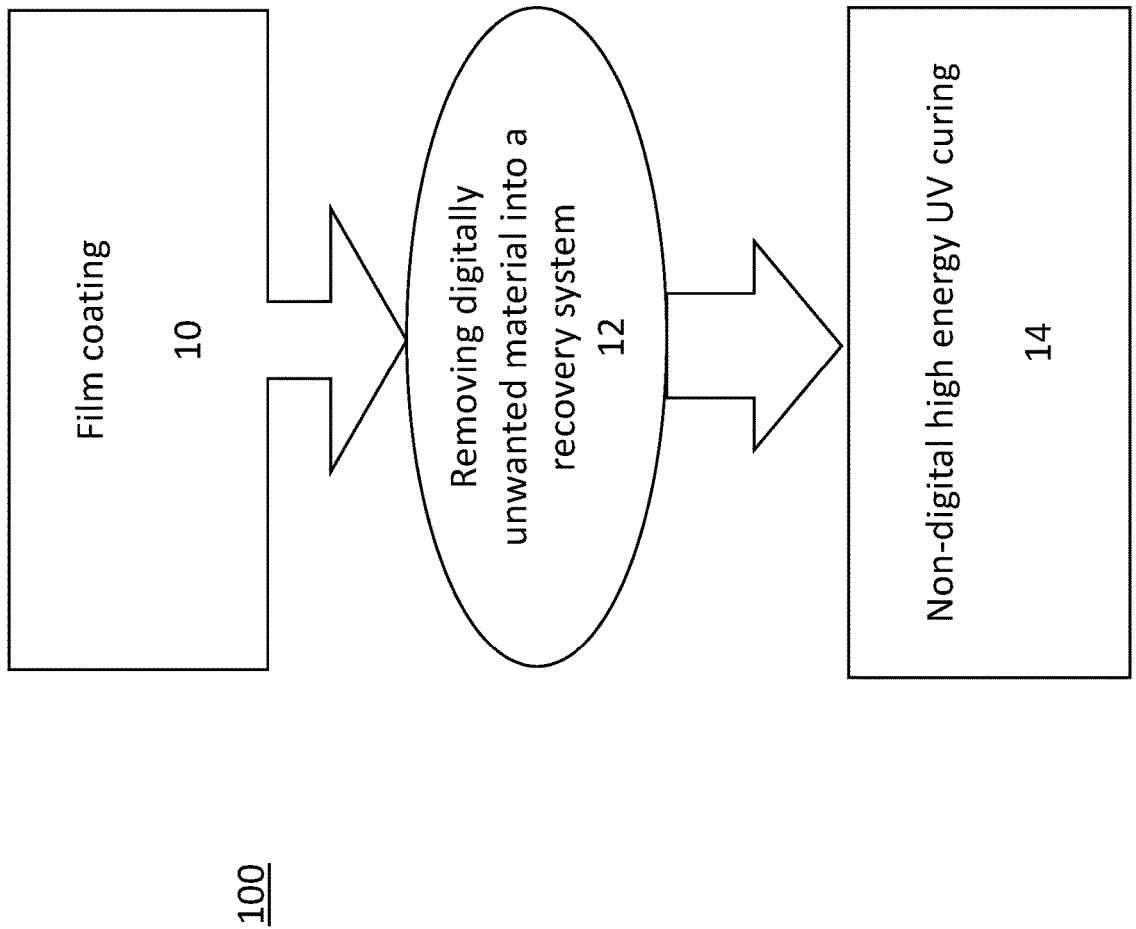
FIG. 1 illustrates, in overview form, an embodiment of the invention, which includes coating a film with a material, removing excess material into a recovery system, and then exposing the coated film to a non-digital curing system (UV or heat based) during contact with the sample, thereby reducing waste and eliminating the need for support material.

The present invention concerns methods and apparatus for the fabrication of solid 3D objects from liquid polymerizable materials at high resolution. In one embodiment, a system configured in accordance with the invention employs laser jetting of a negative image of an initial coated film by polymerizable liquid at a high resolution, and exposure of the image to a corresponding light source during contact between the film and a sample to produce the sample's next layer. Since this is a continuous sequence production process, the rate of 3D object formation and its versatility is improved over conventional 3D printing processes. Before describing the invention in detail, however, it is helpful to present an overview. FIG. 1 provides such an overview, illustrating several constituents of a system 100 configured in accordance with the invention: coating a film with a material 10, removal of excess material into a recovery system 12, and exposure of the coated film to a non-digital curing system (UV or heat based) during contact with a sample 14.

By working with the negative picture of the desired image several important key features of the current invention are revealed: First, any excess of material resulting from the coating process can be reused, and no significant waste is produced during the sample building process. Second, the need for support material is eliminated (although as discussed below, use of supporting material remains an option). The negative picture is supported by the film from its top side during the curing and contact, thereby eliminating the need for supporting material in most instances. There are some structures that may require or benefit from additional support, and so the present invention accommodates such options. Third, systems configured in accordance with the present invention have the ability to print at a very high rates since the jetting and building take place in two different areas and those process can be performed simultaneously. The main constraint on printing speed is either the curing process or the negative printing time, but timings of these individual processes are not additive, meaning that the overall print speed is not limited by an additive combination of the curing time and the negative printing time. There are also fewer limitations for the UV light source used in curing than in conventional 3D printing processes, since the curing process is not digital.

The negative printing unit can be a laser assisted deposition/laser dispensing system with a pulsed laser having enough energy to jet the negative image of the material from the film surface to the recovery unit. The laser can be a UV, IR, $CO_2$, or any other laser.

Figure 4:
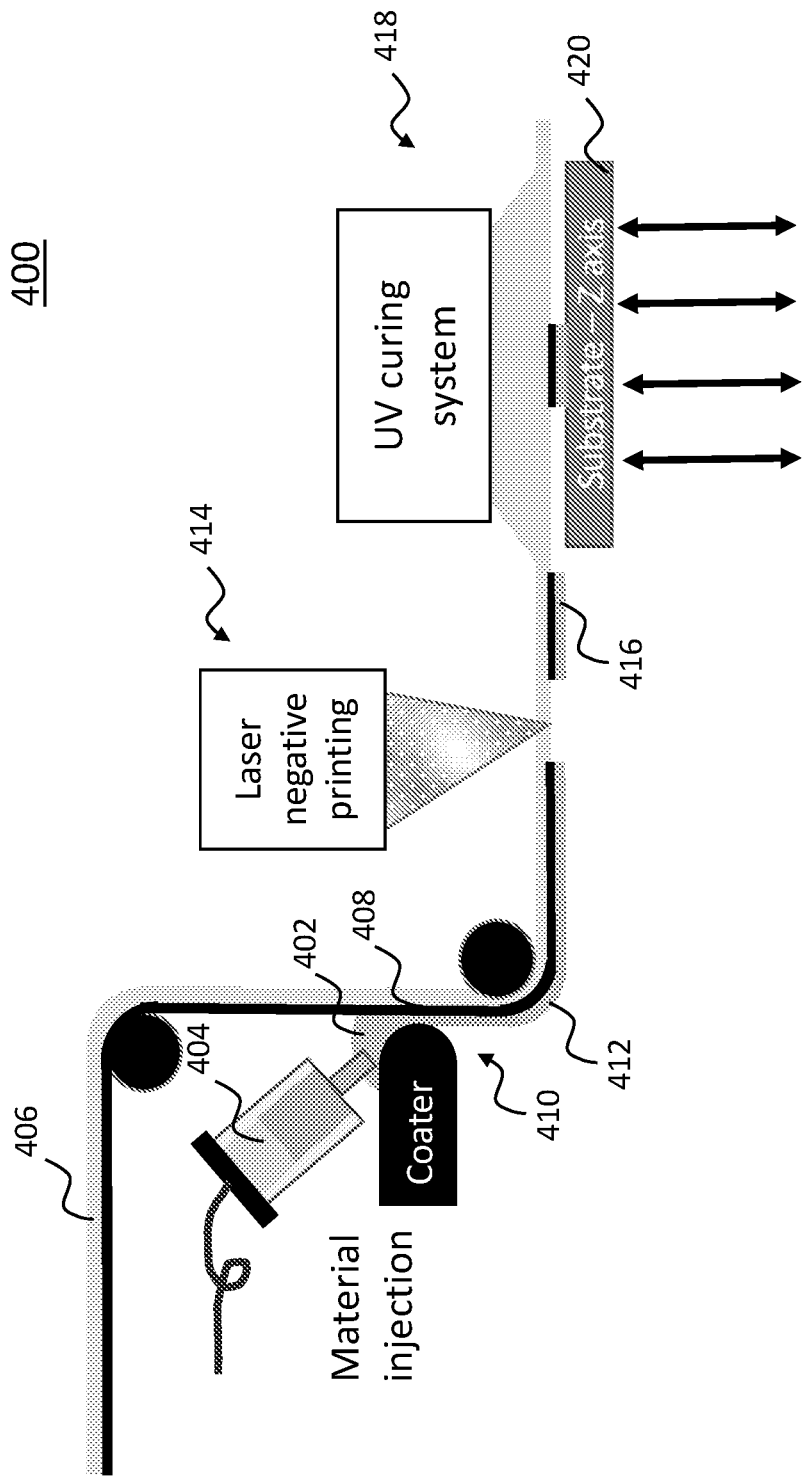
FIG. 4 illustrates an example of a system configured in accordance with present invention, with reels and rollers for coating a material on a film and moving the film through a laser jetting unit towards sample contact during exposure to UV light for curing.

If the printing unit is a laser assisted deposition/laser dispensing system, a uniformly coated substrate has an important role in the robustness of the system. Therefore, an additional coating system is added before the printing unit. This coating system can be a traditional coating system, like a coating system based on micro gravure or slot die coater or a roller coating system. It can also be a screen-printing based coating system, a dispenser, or an inkjet system. In one embodiment of the invention, the coating system can be based on a syringe and gap system as shown in FIG. 4. In such a system 400, material 402 is dispensed from a syringe 404 to a substrate 406 (e.g., by an air or mechanical pump that drives the material from the syringe onto the substrate) and the coated substrate 408 is moved (e.g., by motor-driven rollers or other actuators) towards and through a well-defined gap 410. The gap can be defined by blades or other kind of barrier, as shown in FIG. 4, or by two cylinders (e.g., rollers) spaced close together.

After passing through the gap 410, a uniform layer 412 of material is formed on the substrate and the laser assisted deposition/laser dispensing system 414 can jet material from the coated substrate to a material recovery system. From the laser assisted deposition/laser dispensing system 414, the coated substrate 416 is passed to the curing station 418, where it is brought into contact with a receiving substrate 420 in the presence of a UV light and/or heat, thereby curing the material to form a new layer of the article being fabricated.

In other embodiments of the invention, the coating system may include a screen-printing module where the printed substrate is coated on a screen or stencil of film with well-defined holes and, using a blade or a squeegee, the material is transferred to a substrate in a soft or hard engage. Alternatively, the coating system may include a dispenser or an inkjet head to print the material onto a carrier substrate. Or the coating system may be a gravure or micro-gravure system that coats a substrate with a highly uniform layer of material. In still further embodiments of the invention, the coating system may be a slot-die system that coats a substrate with a highly uniform layer of material. Or the coating system may be a roller coating system that coats a substrate with a highly uniform layer of material.

In any of these and/or other embodiments of the invention, the coating system may be disposed inside of a closed cell with a controlled environment (temperature, pressure, etc.) to prevent evaporation of solvent from the printed material or to prevent material oxidation, thereby helping to prolong the pot life of the material.

In some embodiments of the invention, the coating system contains more than one material. This creates the possibility for printing a plurality of materials onto an intermediate substrate (e.g., a film such as substrate 406 in FIG. 4) in a controlled sequence, making it possible to print more than one material onto a final substrate (e.g., receiving substrate 420 in FIG. 4).

In one embodiment of the invention, the intermediate substrate of the coating system is translatable forwards and backwards (from the standpoint of applying material to the intermediate substrate) in a controlled manner, while opening the gap between the coater rollers, creating the possibility for recoating the same area of the intermediate substrate with the printed material multiple times without contamination to the rollers. Such a process also reduces (or eliminates) the amount of intermediate substrate consumed during the initial printing process, preventing waste.

In some embodiments, after a current uniform layer of material coated on the intermediate substrate has been consumed (fully or partially) by printing in the printing unit, the intermediate substrate may loop back to the coating system for recoating or translate back to the coating system for application of a new uniform coated layer for the next printing process.

The film (or other intermediate substrate) used for printing can be a substrate that is transparent at the laser wavelength with or without a metal (or other) coating. Examples of such a film (substrate) are PET, BOPP, PI, etc. The film may be coated with a metal or polymer coating with additive(s) that adsorb at the laser wavelength and create transparent areas digitally with exposure to the laser negative jetting system.

Among the materials for printing that may be used in systems configured in accordance with the invention are any liquid or paste materials. However, the benefits of the present systems are chiefly present when highly viscous materials that cannot be printed properly in high resolution by other methods are employed. For example, UV/visible light-cured material formulations and UV-cured monomers and polymers of viscose or sensitive materials can be printed using systems configured in accordance with the invention. Other materials that can be printed with systems configured in accordance with the invention are acrylates, epoxies, urethanes, adhesives, pastes, and inks using either UV curing or heat curing. Still further materials that can be printed with systems configured in accordance with the invention are UV-cured monomers and polymers with additives such as ceramics, metals, organic additives, fiber reinforcement, etc. Also, materials such as UV-cured waxes, low or high viscosity materials that are cured or even partially cured by light, epoxy based, urethane based, or silicone family materials with or without UV curable ends, where the reaction is initiated by heat or other catalyst (Pt, OH, etc.), ceramic and metal pastes, and solder pastes, bio-compatible materials, and thermoplastic materials (at room temperature or at elevated temperatures with adjustment of the environment temperature) can all be printed with systems configured in accordance with the invention. Possible basic formulations and mechanisms can use monomers and polymers of acrylate, epoxy, urethane, or other UV or light sensitive materials with a light sensitive initiators or/and co-initiators or sensitizers, for example: acetophenones, thioxanthones, phosphine oxides, iodonium and sulfonium salts, etc.

Figure 2:
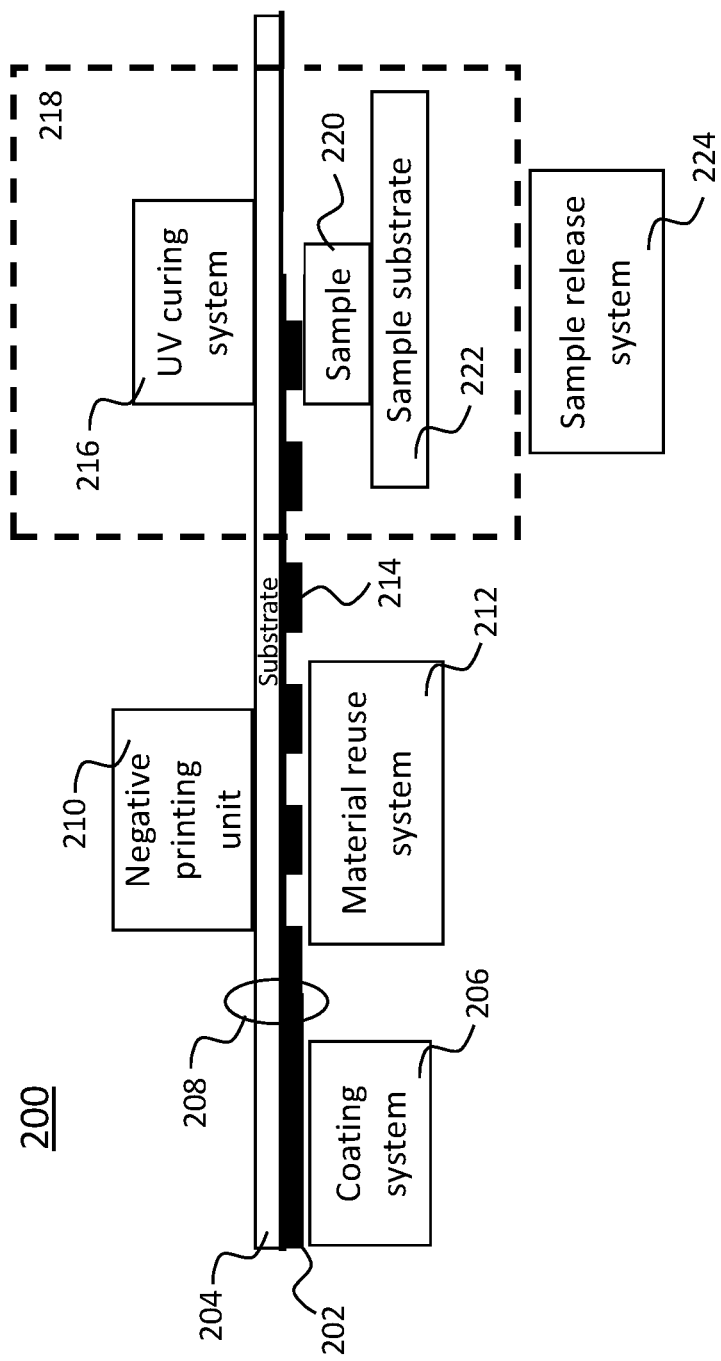
FIG. 2 illustrates schematically a system configured in accordance with one embodiment of the invention, highlighting a coating process, negative printing with a material recovery unit, and curing during contact with a sample; an optional sample release unit is also shown.

FIG. 2 shows a system 200 configured in accordance with one embodiment of the invention. In this system, material 202 is first dispensed onto a transparent substrate 204 by a coating system 206, for example one using a syringe and gap system, as discussed above. The material-coated substrate 208 is provided to a negative printing unit 210 in which a negative image of the layer to be added to the sample is created by eliminating (e.g., via laser jetting) excess material (i.e., that part of the coated material that will not be added to the sample) from the coated substrate. As illustrated, this excess material may be collected by a material reuse system 212 and provided back to the coating system 206 for reuse. As shown in this view, the remaining material 214 on the coated substrate is provided to a curing system (e.g., a UV curing system) 216 and/or an imaging system on its way to the sample building unit 218 where UV curing and/or drying can be used during contact with the sample 220. By curing/drying the material while it is in contact with the sample (that is, previously formed portions of the article under fabrication, which are disposed on a receiving substrate 222), the sample's next layer is printed directly thereon. A sample release system 224 then effects release of the sample 220 from the transport substrate 204.

Figure 3A:
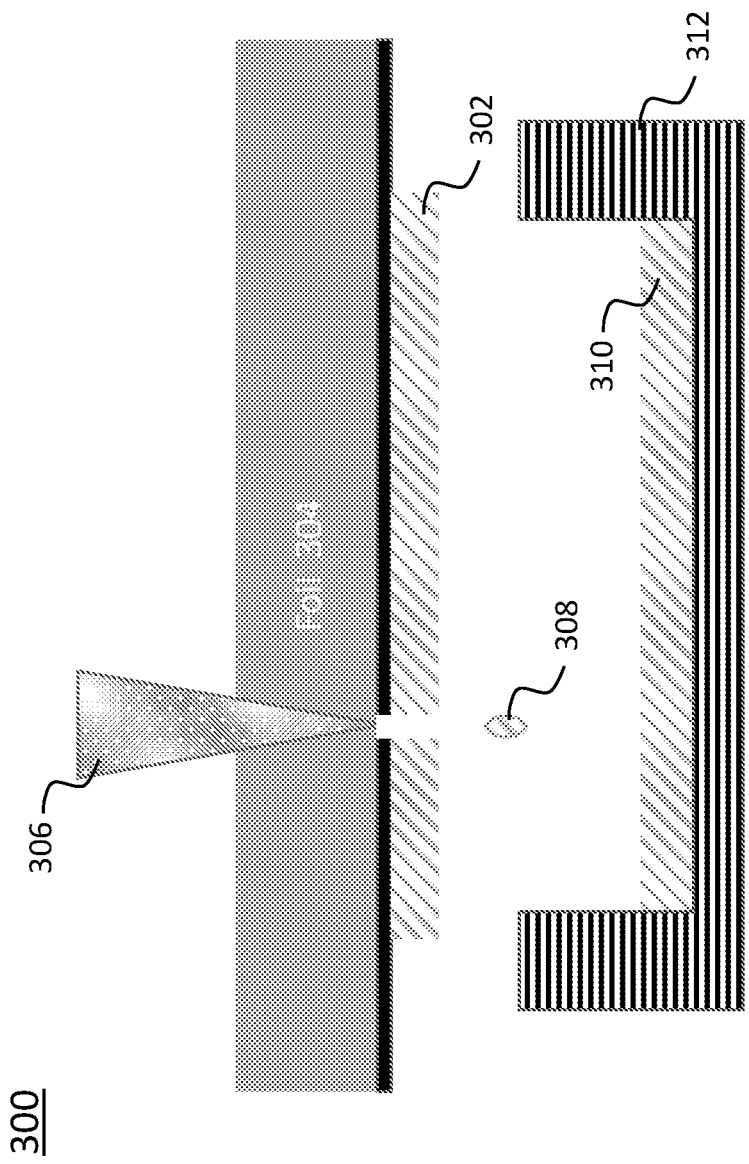
Figure 3B:
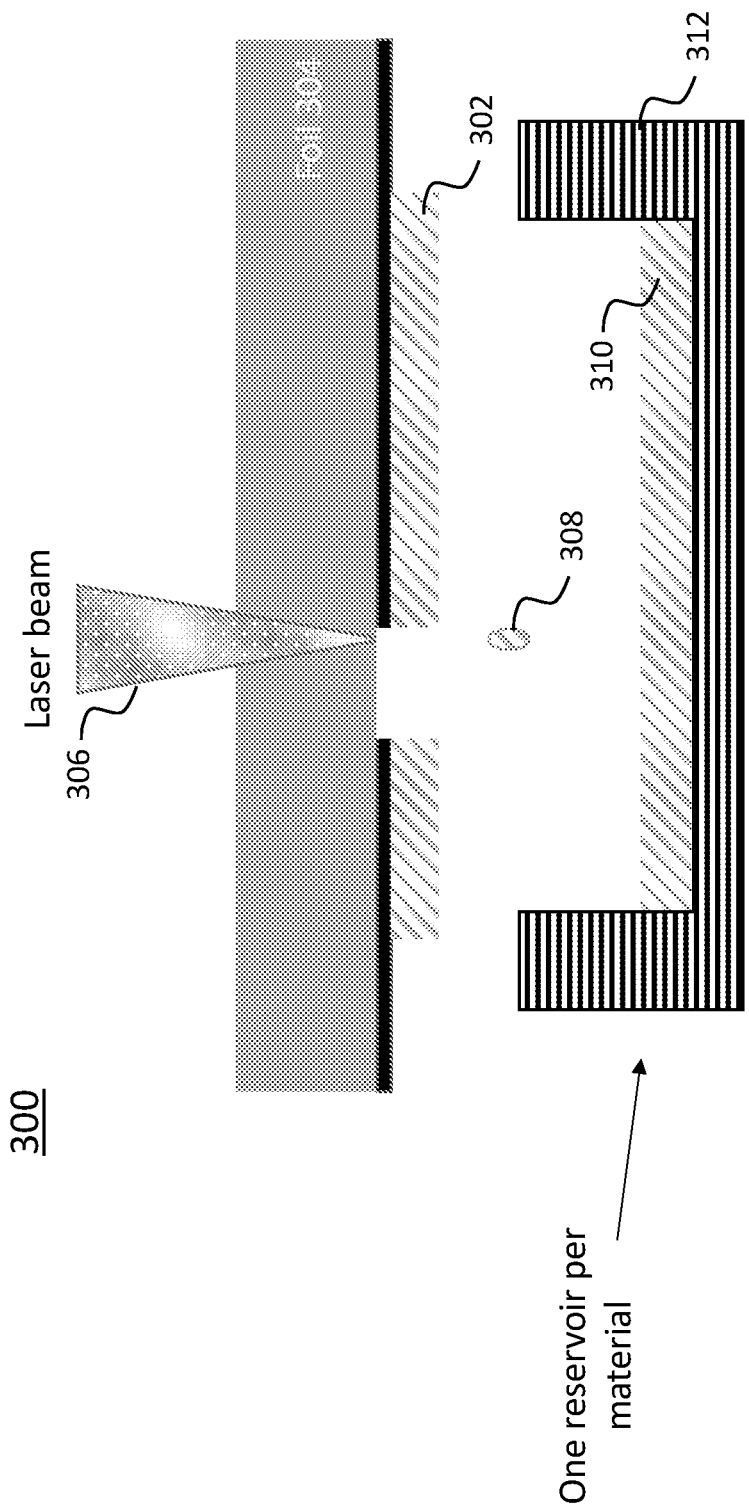
Figure 3C:
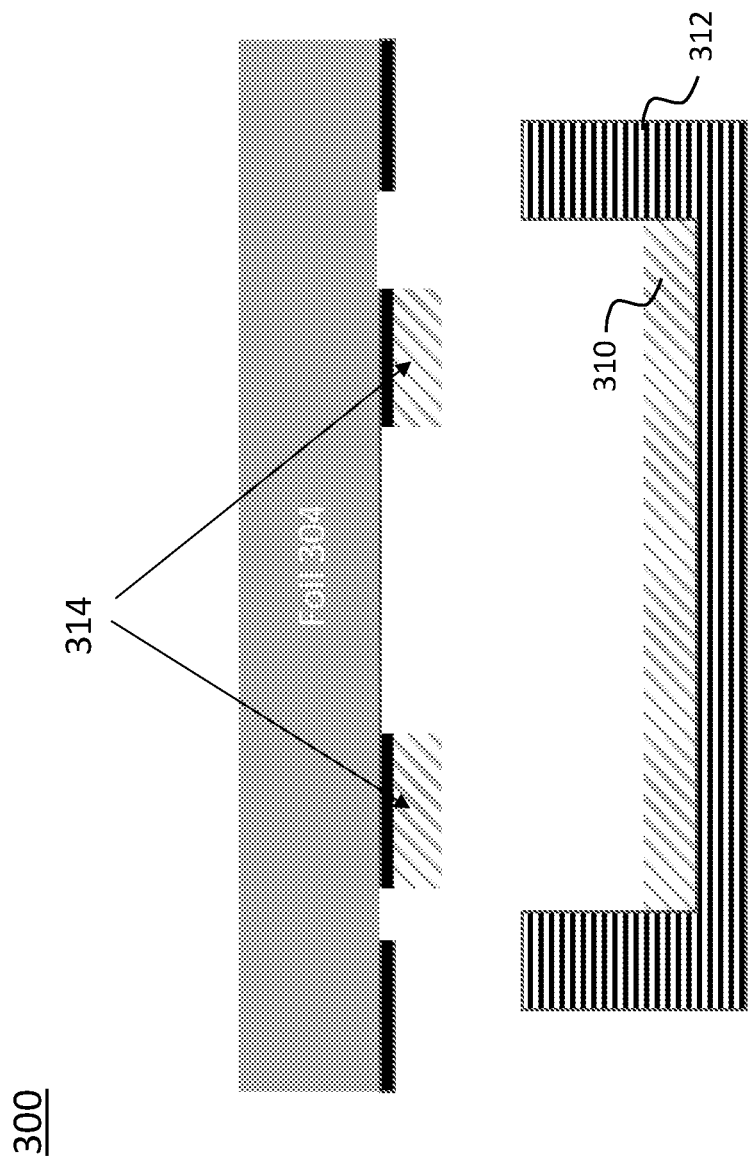

FIGS. 3a-3m illustrate in detail various steps involved in the overall printing process. Referring first to FIG. 3a, the negative jetting process 300 is illustrated. A layer 302 of material has been coated on an intermediate substrate (e.g., a film or foil) 304. A laser 306 is used to jet the negative of the image (of the next layer to be printed to the sample) from the coated substrate using the material's or the coated metal film's laser absorption properties. The jetted material 308 is collected 310 in a material recovery unit 312 (or units, if several materials are in use) and the material can be reused later (FIGS. 3a and 3b). Only segments of the image material 314 stay on the film 304 for further use (FIG. 3c).

Figure 3D:
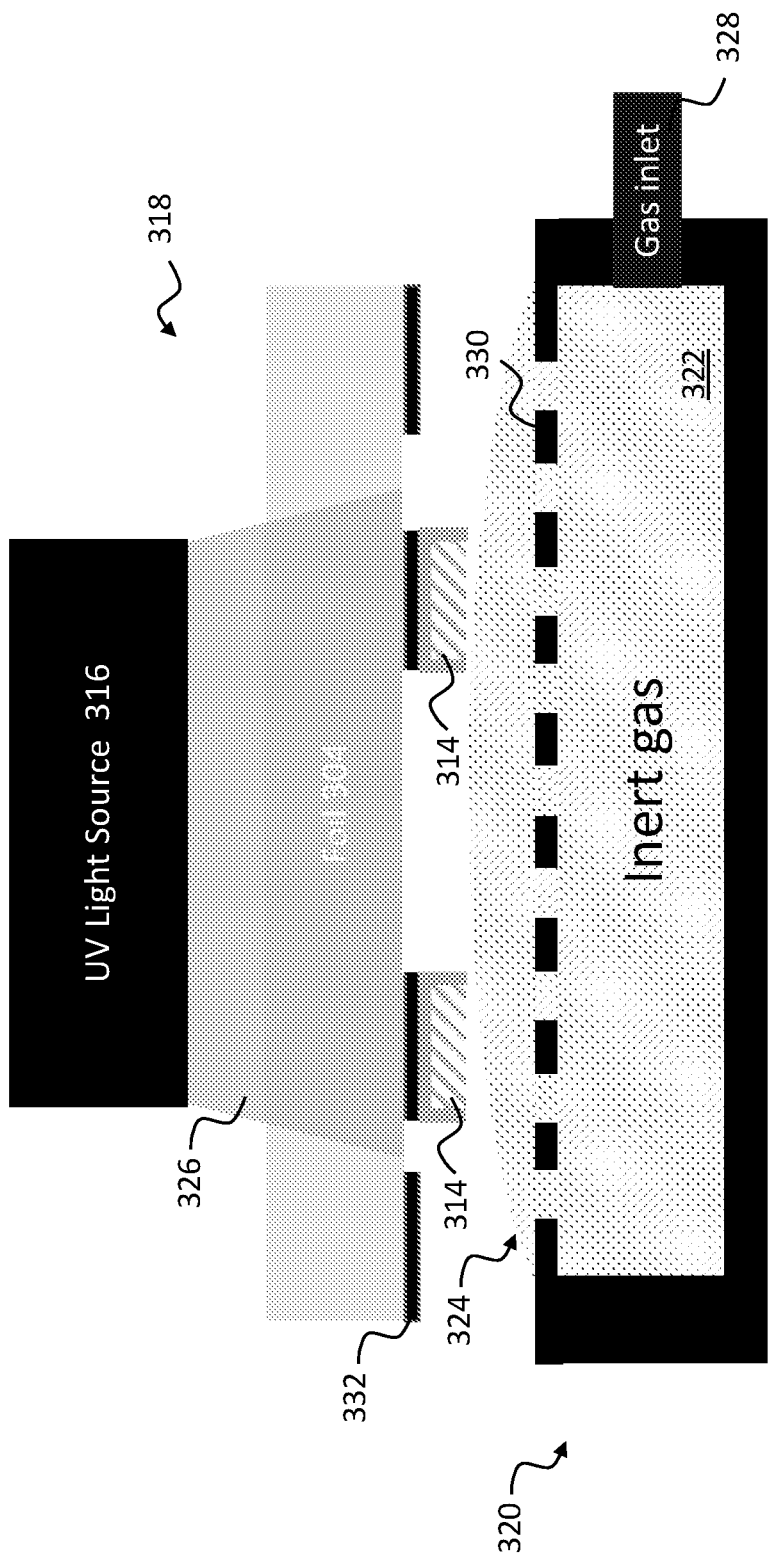

Optionally, as shown in FIG. 3d, the image material 314 on the film can be exposed to low power UV light 326 or temperature before contact with the sample. Because some materials, mostly liquid ones, need enhanced definition of image material boarders before such contact, e.g., to avoid a severe reduction in printing resolution, this procedure allows the boundaries of the portions of material image 314 to be well defined. In such a process, a UV partial curing station 318 may include a gas diffusion system 320 for introducing an inert gas (e.g., Ar, $CO_2$, He, Ne, etc.) 322 into a workspace 324 in which UV light 326 from the UV light source 316 will be incident upon the material layer 314. The inert gas flows in from one or more gas inlets 328 and out through a diffuser 330 towards the workspace 324. A gas pressure homogenizer may be used to ensure constant pressure throughout the system.

Preferably, the intermediate substrate 304 is coated with a thin metal foil 332, for example, a 20 nm thick layer of Ti. The layer of metal foil will substantially reduce transmission of the UV light 326 where present, ensuring that only the edge of the material layer 314 near the area of contact with the intermediate substrate 304 is cured or partially cured. As an example, a 20 nm thick layer of Ti will transmit only approximately one tenth of the UV light 326 that an unprotected area of the intermediate substrate 304 will transmit. In areas where the metal foil has been eliminated, e.g., as by laser ablation or other process, the UV light 326 will be incident upon the edges of the segments of the material layer 314, again ensuring that it is these edges only that are cured or partially cured. As an additional safeguard to prevent unwanted curing or over curing of the segments of the material layer 314, the gas diffusion system 320 may be made of a non-reflective material so that UV light 326 is not reflected towards the segments of the material layer 314.

The presence of inert gas 322 pumped through the diffuser purges any oxygen from the workspace 324. The thickness of this workspace region is related to the gas pressure as it is forced through the diffuser 330. With the segments of material layer 314 maintained in the area of the workspace from which oxygen has been purged, the UV curing system then cures the bottom and edges of these segments through exposure to UV light 326 from the UV light source 316.

Figure 3E:
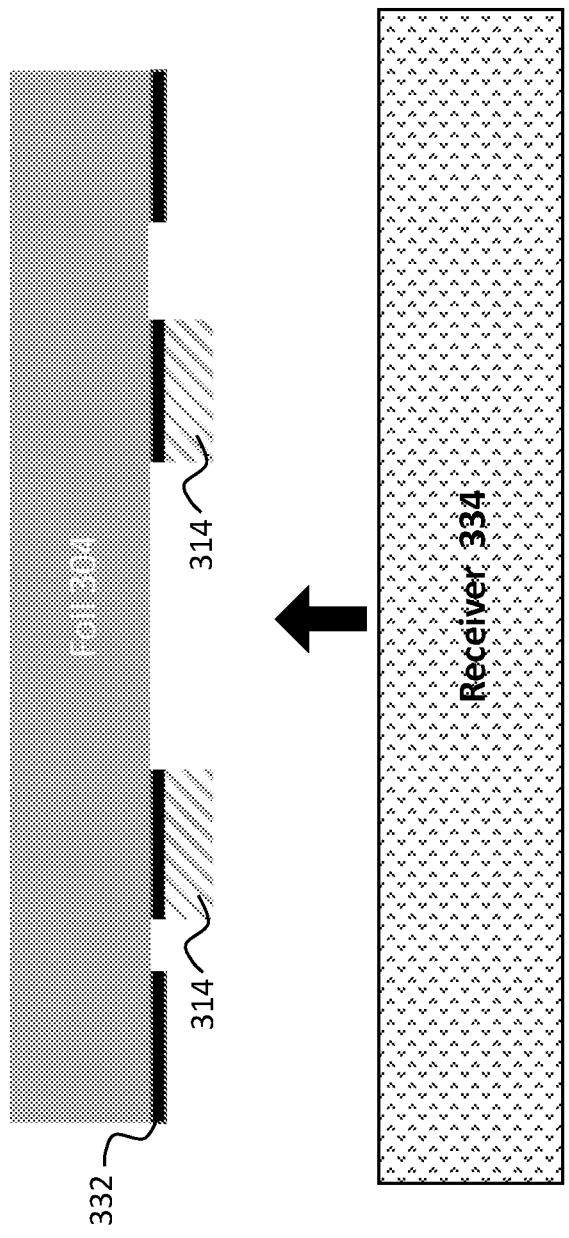
Figure 3F:
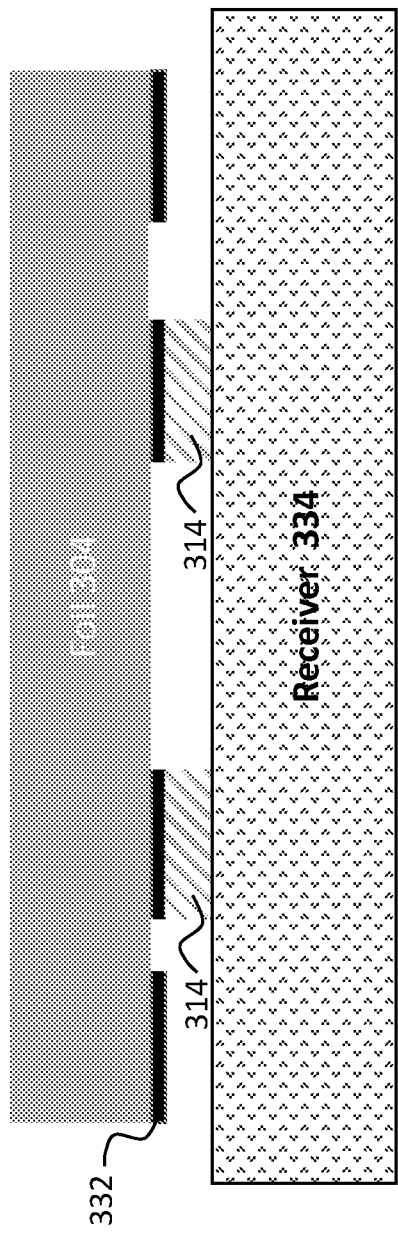
Figure 3G:
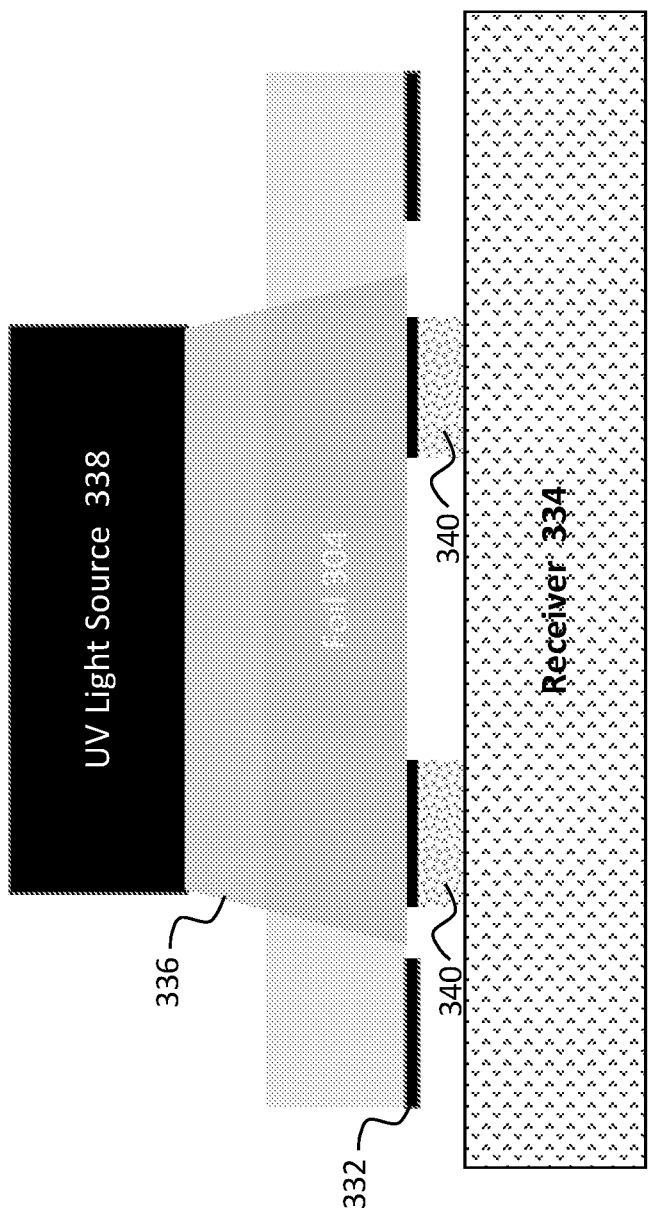

FIGS. 3e and 3f provide before and after views of the contact between the film 304 (i.e., the segments of coated material 314 on the film) and the sample, while FIG. 3g illustrates the UV exposure and building of the sample. This stage may use either UV exposure or exposure to high temperature (a coated polyimide film such as Kapton can be used in such cases) to effect transfer of the material to the sample. As shown, the film 304 is brought into an area at which the receiving substrate 334 is present, and the receiving substrate (or an existing layer of the sample, if present) is brought into contact with the segments of coated material 314 on the film (e.g., by raising a state on which the receiving substrate is present). Then, the segments of coated material 314 are cured through exposure to UV light 336 from a UV light source 338. This may be the same or a different UV light source as mentioned above. The exposure to the UV light 336 (and/or heat) cures the segments of coated material to form segments of a new layer 340 of the sample (i.e., the object undergoing fabrication).

Figure 3H:
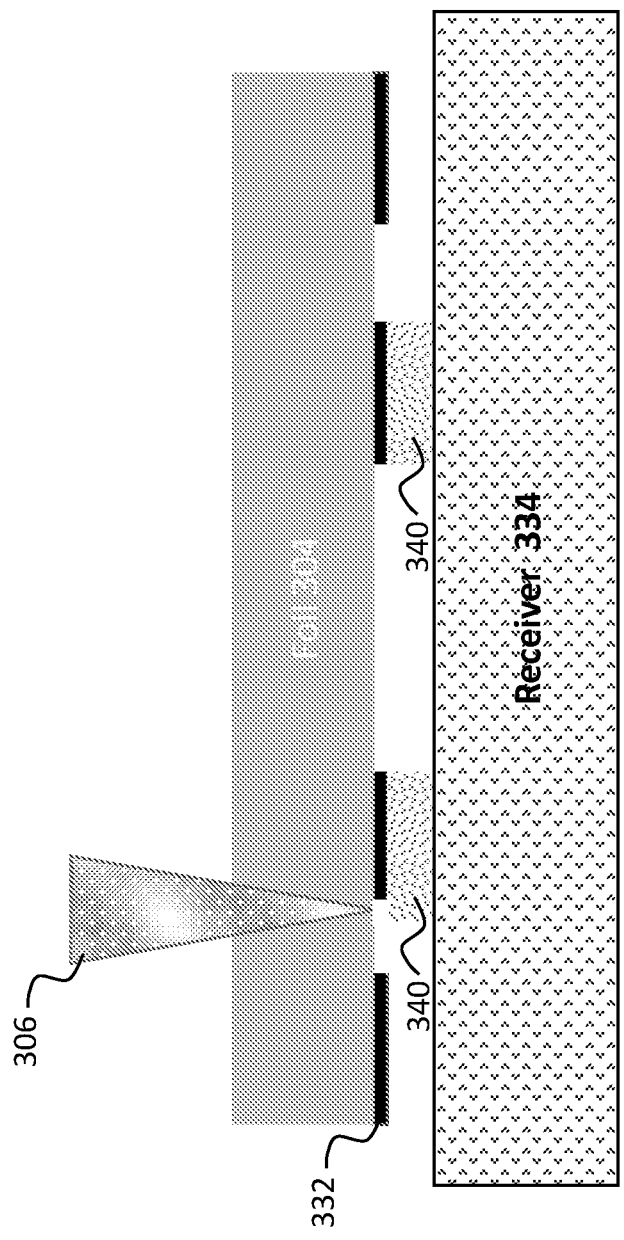
Figure 3I:
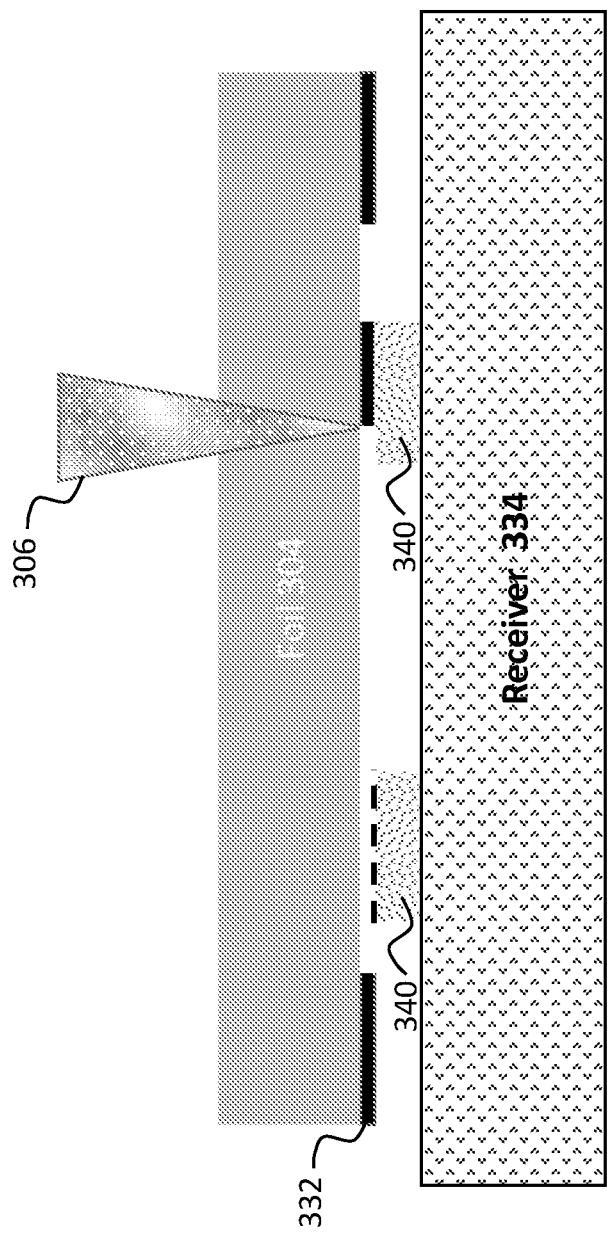
Figure 3J:
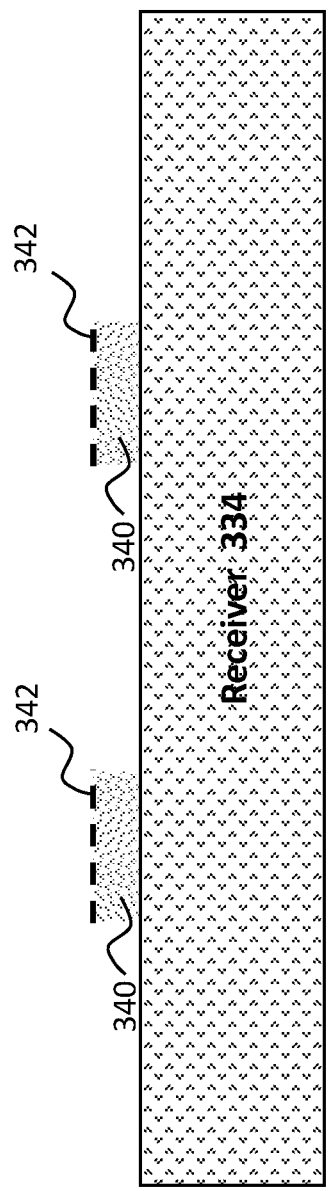
Figure 3K:
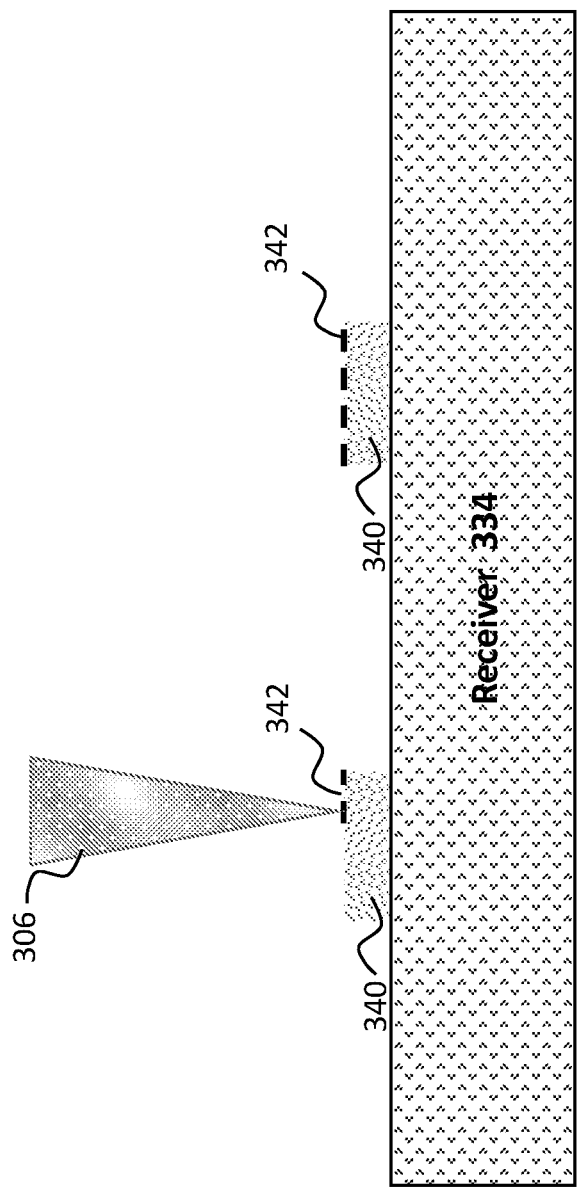
Figure 3I:
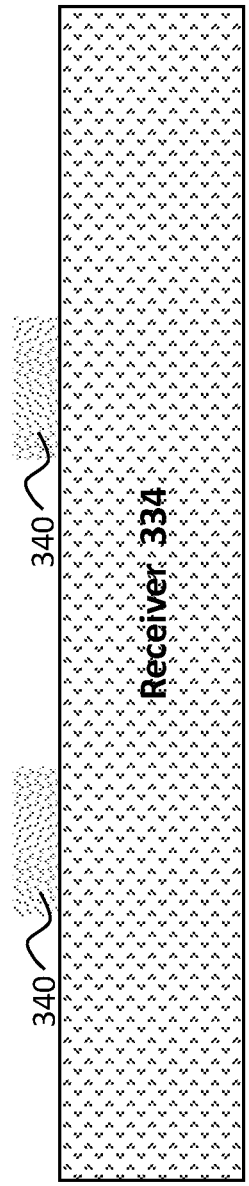
Figure 3M:
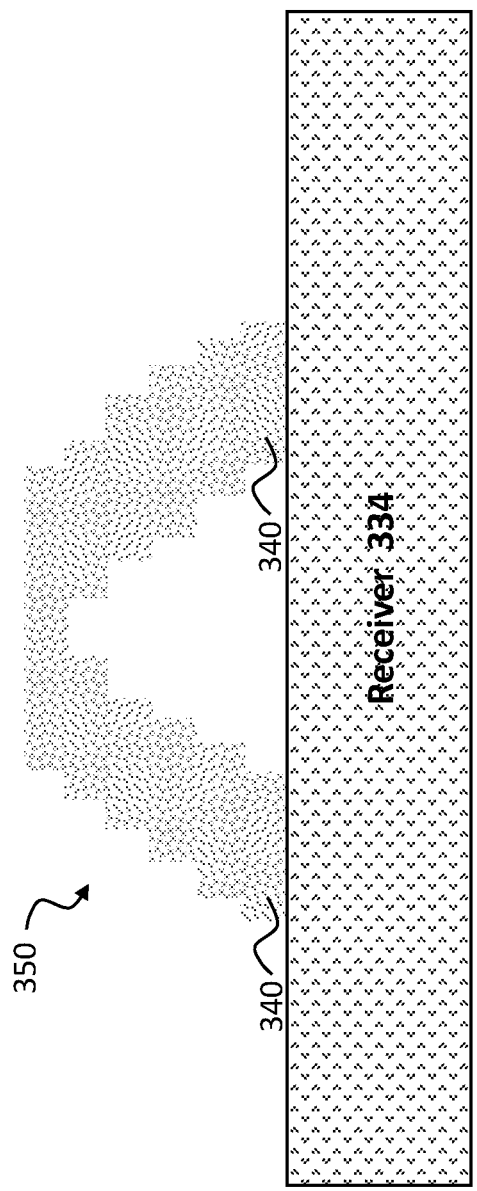

After curing, the sample remains connected to the film 304 (through the segments of the newly cured layer 340). Therefore, a release mechanism is preferably provided. To that end, the laser itself (used for the negative printing) 306 can be used as a sample release unit since the metal coat of the film 304 is still beneath the now-cured material and can be used for laser wavelength absorption and sample release as shown in FIGS. 3h-3j. The laser 306 irradiates the positioned at which the segments of the newly cured layer 340 are present, permitting such separation. The laser can also be used for cleaning the sample of metal residues 342 that may have detached from the film 304 during sample release (FIG. 3k), leaving a clean, cured layer 340 present on the sample (FIG. 3*l*). The result 350 of printing several layers 340 is presented at FIG. 3*m*.

FIGS. 4-7 show examples of configurations of systems for performing the methods of the present invention. In one embodiment of the invention, only one material is provided for printing only one layer. FIG. 4 illustrates such a configuration: Material 402 is coated on film 406; a laser system 414 removes the image negative, and multiple samples 420 are moved into contact with the film 406 sequentially. The material 416 is cured during contact, and a new sample replaces the old one.

Figure 5:
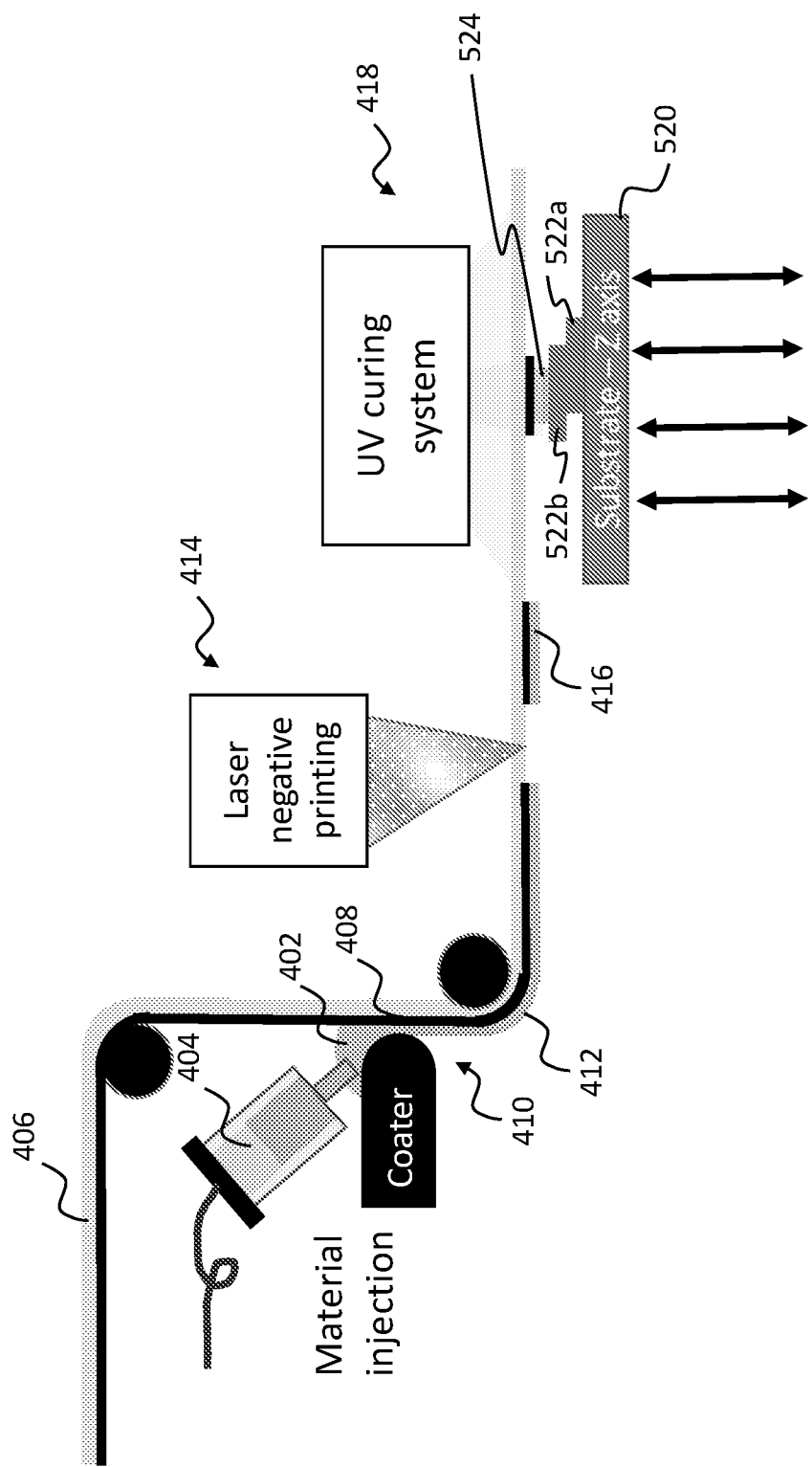
FIG. 5 illustrates a further example of the system shown in FIG. 4, with several layers having been printed.

FIG. 5 illustrates a 3D version of the configuration shown in FIG. 4. This time, the same sample 520 is brought into repeated contact with the film 406 and each time a new layer 522*a*, 522*b*, etc., is added (printed) to the sample. The curing takes place during contact of the top of the sample with the material in a new layer 524 on the film. However, it is important to note that if there is no direct contact between the material on the film and the sample, the transfer from the film to the sample will not occur. Therefore, the transfer depends on the area of each unit of material on the film and the surface structure of the sample.

Figure 6:
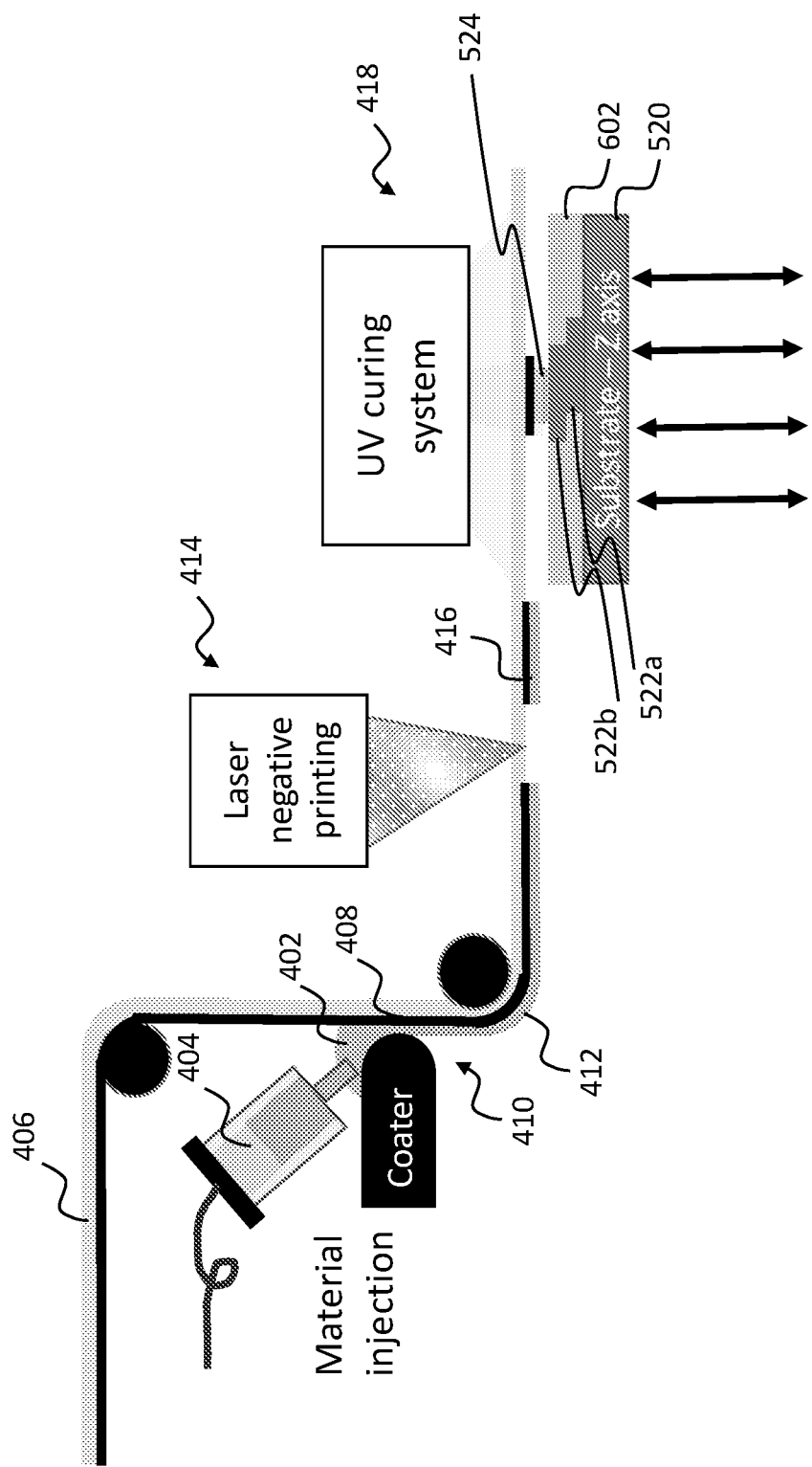
FIG. 6 illustrates yet a further example of the system shown in FIG. 4, with several layers having been printed with the optional addition of a support material between layers.

One way to overcome this issue is to add a support material 602 that will come in contact with the film 406 and therefore will transfer all the material 524 on the film to the sample. FIG. 6 illustrates the use of support material 602 in order to collect all the material from the film to the sample.

Figure 7:
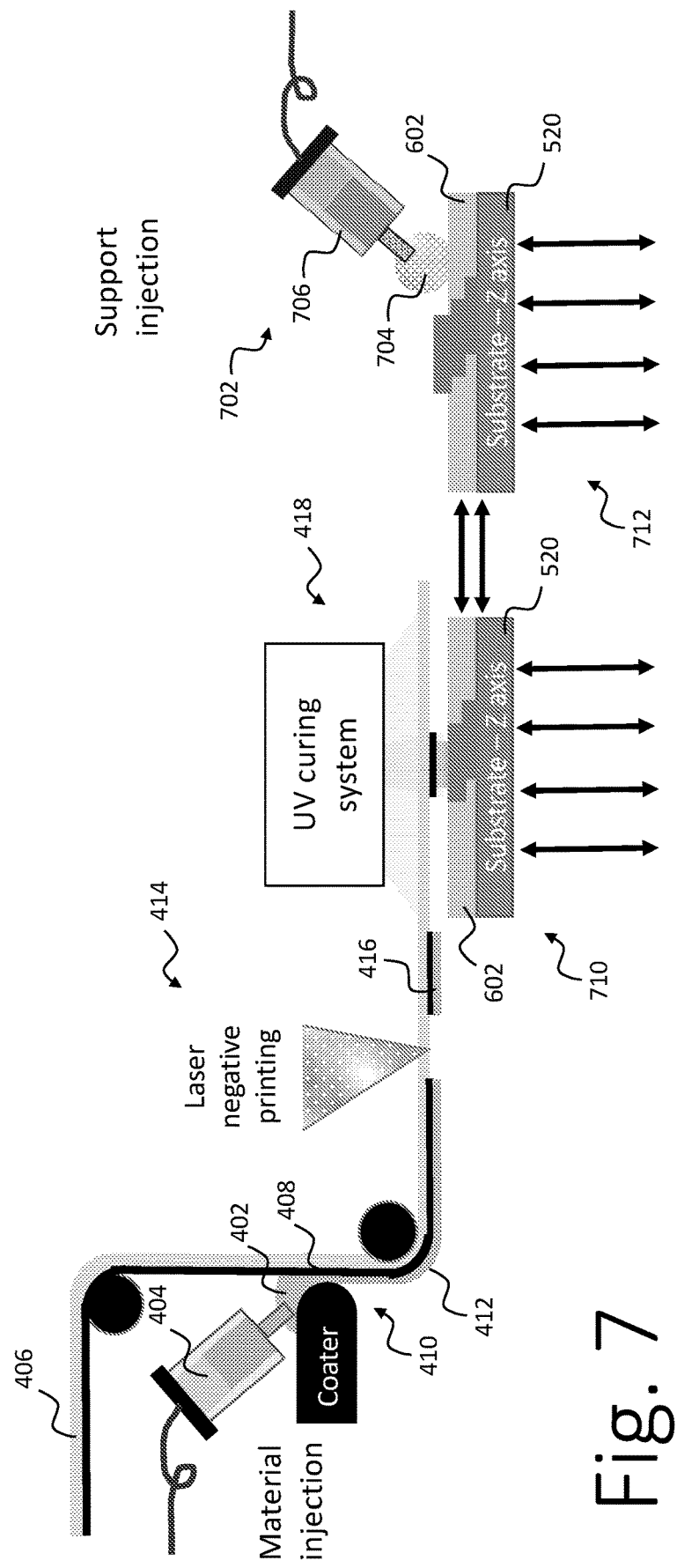
FIG. 7 illustrates yet a further example of the system shown in FIG. 4, with several layers having been printed and including a support addition system configured for injection of the support material.

FIG. 7 illustrates the use of an optional unit 702 for 3D negative printing with a support material. The optional unit 702 injects the support material 704 mechanically (e.g., via a syringe 706) to even the sample height that will be in contact with the film 406 during curing. The sample 520 is moved back and forth between the curing position 710 and the support injection position 712 between layers.

Figure 8A:
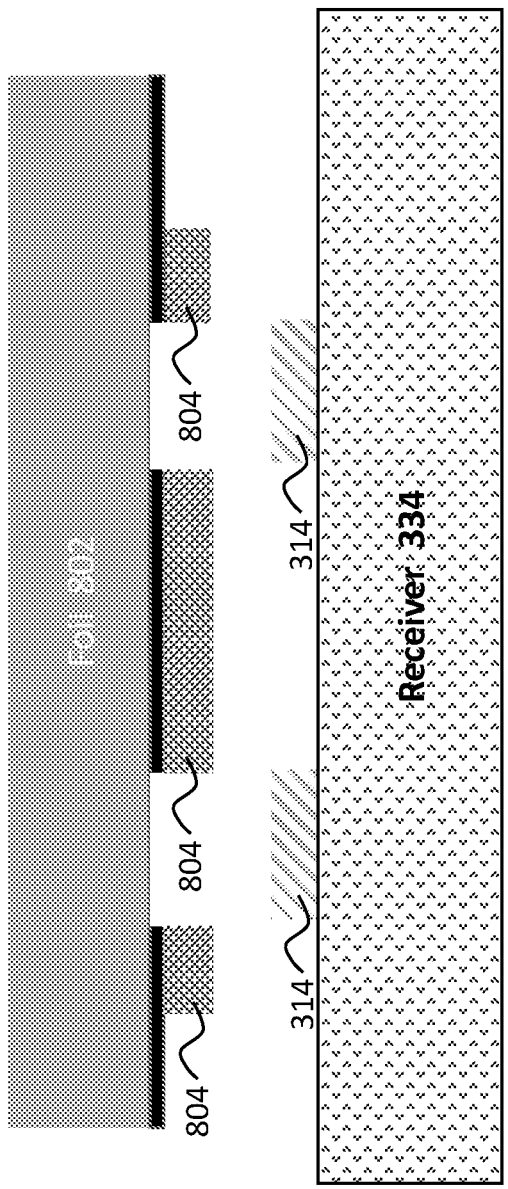
FIGS. 8a and 8b illustrate aspects of an embodiment of the invention in which multiple materials are used during printing, both before (FIG. 8a) and after (FIG. 8b) contact with the sample.
Figure 8B:
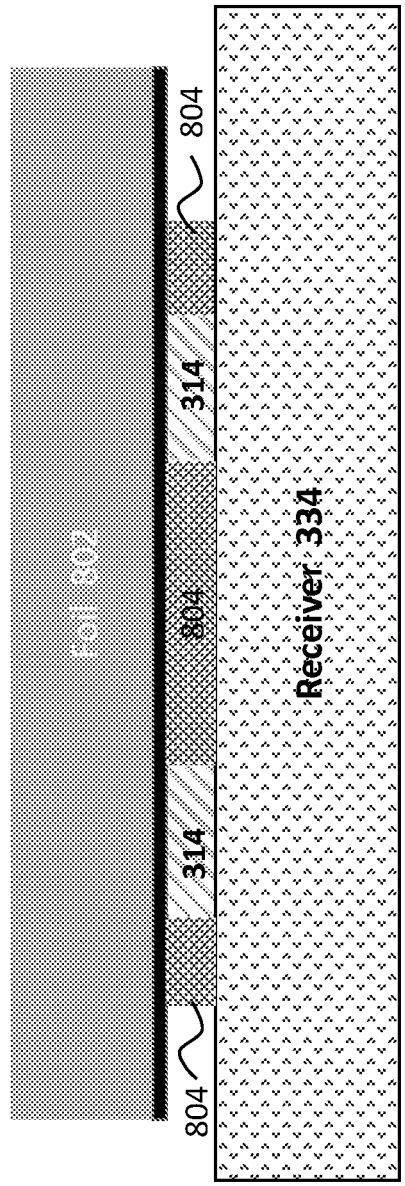

An even more advanced configuration of a system configured in accordance with embodiments of the invention is one for the 3D printing of multiple materials. In such cases, several coating units are placed to provide different materials to the transfer film(s) and different materials are coated on the film or films, negative images for each respective material are removed from the film(s), and the materials are brought into contact with the sample and transferred thereto. FIG. 8*a*-8*b* illustrate before and after views of the contact between a substrate 802 that includes a second material 804 and a sample 334 that already contains the first material 314. The negative images of the different materials are compatible so that they can co-exist in the same layer.

Figure 9A:
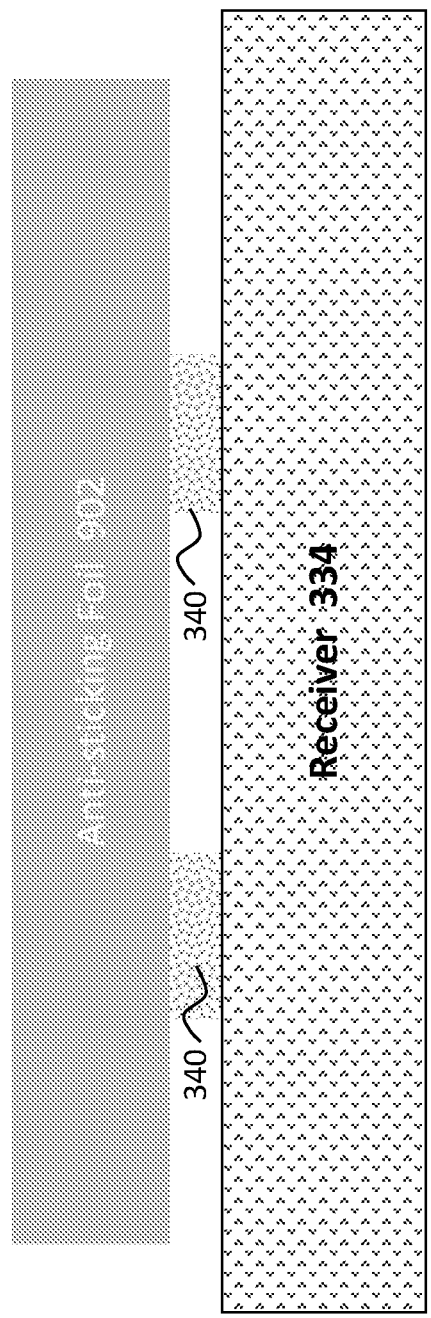
FIGS. 9a and 9b illustrate aspects of an embodiment of the invention in which printing uses an anti-sticking foil to prevent sample distortion during curing (FIG. 9a) and sample release (FIG. 9b) processes.
Figure 9B:
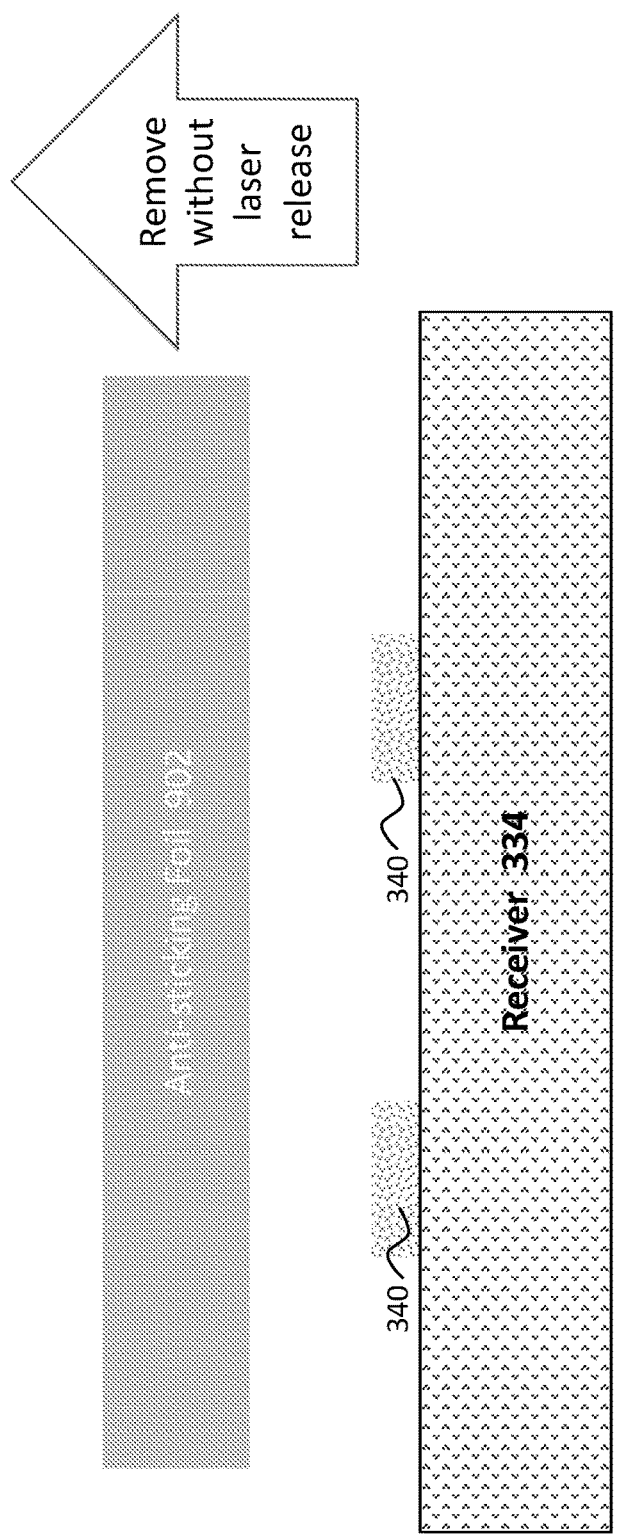

The film itself could be a transparent anti-stick foil. For example, PTFE or PFE or other anti-stick foils can used in order to ensure the easy release of the sample from the film after curing. FIGS. 9*a*-9*b* illustrate before and after views of the release process based on anti-stick properties of a film 902. That approach for sample release could be a complementary approach to the laser release mechanism mentioned above or the only release mechanism to be used.

Figure 10:
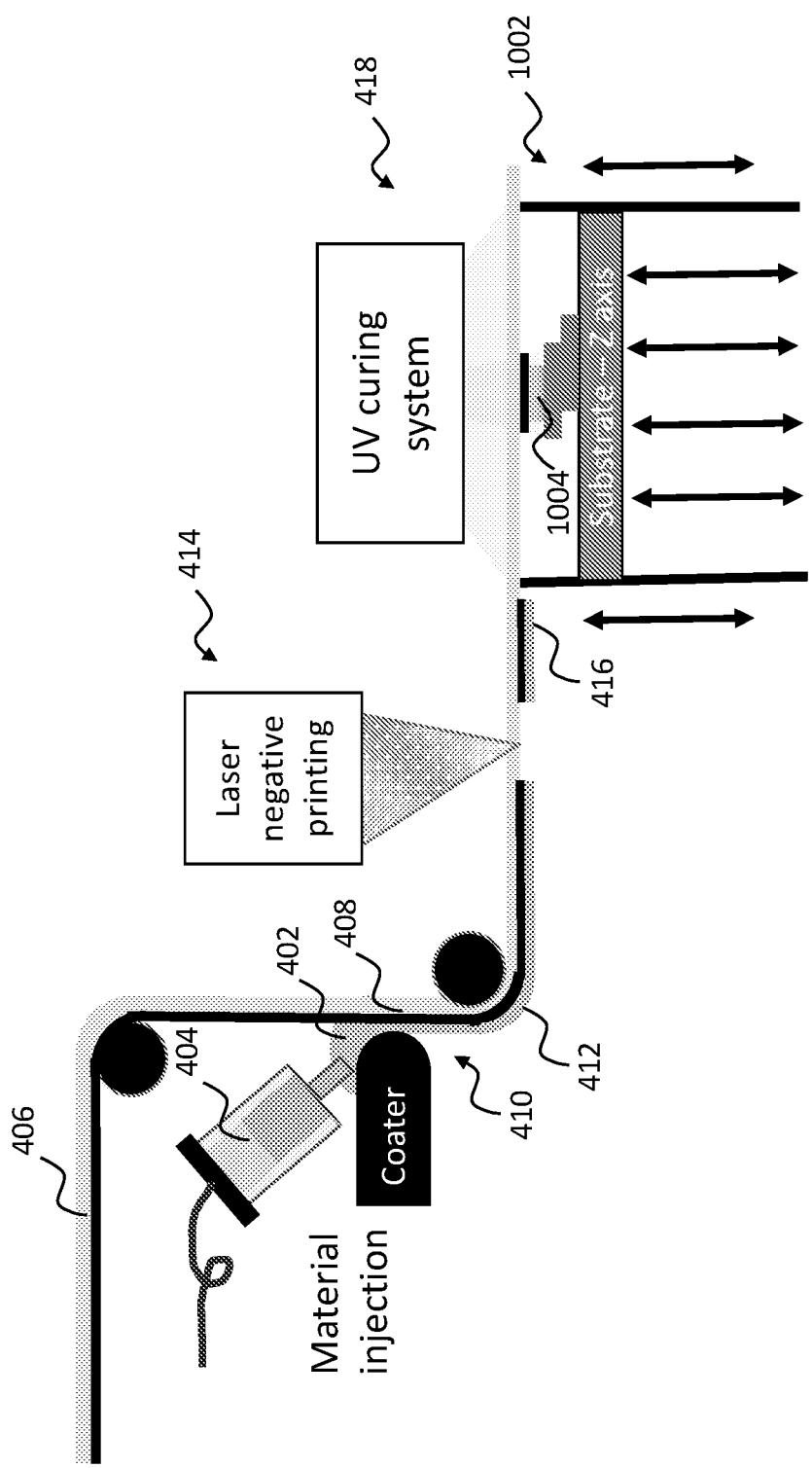
FIG. 10 illustrates aspects of an embodiment of the invention in which printing includes using a mechanical release system to enable fast and accurate sample building.

Yet another approach for sample release could be a dominantly mechanical approach. FIG. 10 illustrates a mechanical release system 1002 that can work with or without the formerly mentioned release mechanisms. Any of several mechanical approaches can be used. For example, a low angle release towards a "Y"-axis, by moving the film 406 at a small angle away from the sample 1004, can be used. Alternatively, two Z-axes, one for a frame (holding the film 406) and one for the sample 1004 may be used. Another approach would be to use acoustic vibrations to release the film 406 from the sample 1004.

Figure 11:
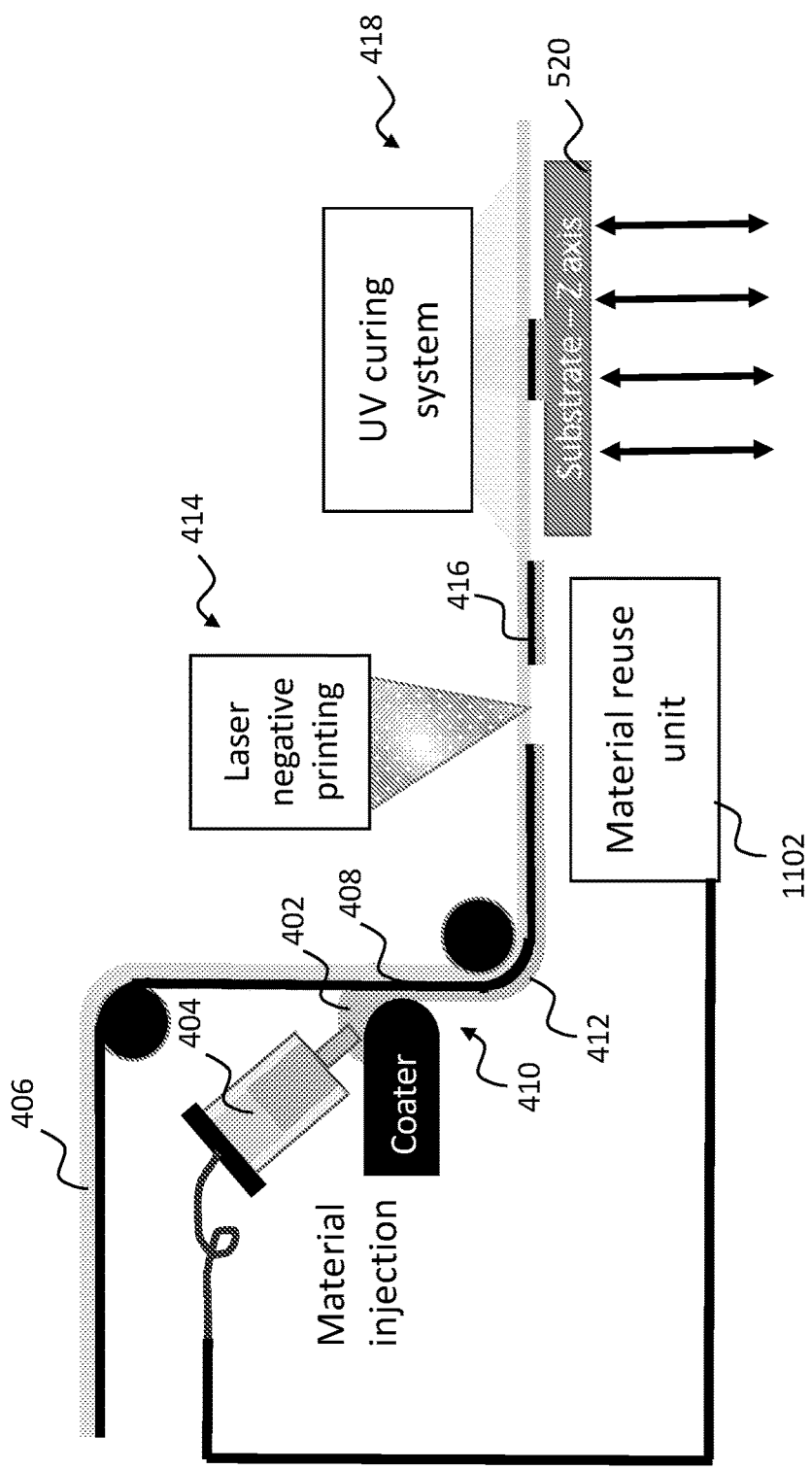
FIG. 11 illustrate aspects of an embodiment of the invention in which printing includes using a material recovery system to reduce the waste of excess material during sample building.

FIG. 11 illustrates one additional feature of a system configured in accordance with embodiments of the invention: the material reuse system 1102. In order to reduce waste, the negative image printing can be done above a tray or other vehicle that collects unused material and injects it back into the syringe 404 of the coating unit.

Not shown in the above-described views are one or more units that control the operation of the various systems. Persons of ordinary skill in the art will appreciate that such units, often called controllers or similar names, are processor-based units that are programmable to carry out the above-escribed processes by issuing signals to elements of the coating system, the negative printing unit, the material reuse system, the curing system(s) and the sample release system. In some cases, these signals will actuate end effectors, rollers, lasers, UV or IR lighting/heating systems, and other elements to carry out the above-described tasks. Such a controller generally includes a processor or processors that execute(s) computer-readable instructions (i.e., computer programs or routines) defining methods as described herein, which methods are instantiated and run on non-transitory computer-readable media. Such processes may be rendered in any computer language and executed on any suitable programmable logic hardware. Processor-based controllers upon or with which the methods of the present invention may be practiced will typically include a bus or other communication mechanism for communicating information; a main memory, such as a RAM or other dynamic storage device, coupled to the bus for storing information and instructions to be executed by the processor and for storing temporary variables or other intermediate information during execution of instructions to be executed by the processor; and a ROM or other static storage device coupled to the bus for storing static information and instructions for the processor. A storage device, such as a hard disk or solid-state drive, may also be included and coupled to the bus for storing information and instructions. The subject controller may, in some instances, include a display coupled to the bus for displaying information to a user. In such instances, an input device, including alphanumeric and/or other keys, may also coupled to the bus for communicating information and command selections to the processor. Other types of user input devices, such as cursor control devices may also be included and coupled to the bus for communicating direction information and command selections to the processor and for controlling cursor movement on the display.

The controller may also include a communication interface coupled to the processor, which provides for two-way, wired and/or wireless data communication to/from the controller, for example, via a local area network (LAN). The communication interface sends and receives electrical, electromagnetic, or optical signals which carry digital data streams representing various types of information. For example, the controller may be networked with a remote unit to provide data communication to a host computer or other equipment operated by a user. The controller can thus exchange messages and data with the remote unit, including diagnostic information to assist in troubleshooting errors, if needed.

Thus, methods and apparatus for the fabrication of solid three-dimensional objects from liquid polymerizable materials at high resolution have been described.

What is claimed is:

1. A method, comprising:
  coating a substrate with a material in a printing and coating unit to produce a coated substrate having a uniform layer of liquid polymerizable material thereon;

transporting the coated substrate to a negative printing unit and there removing portions of the liquid polymerizable material to leave an image of a layer of an article in the liquid polymerizable material remaining on the substrate;

after the portions of the liquid polymerizable material have been removed, transporting a resulting version of the coated substrate from the negative printing unit to a sample building unit;

in the sample building unit, engaging the liquid polymerizable material remaining on the substrate with a sample; and in the sample building unit, curing the liquid polymerizable material remaining on the substrate with ultraviolet (UV) light when the liquid polymerizable material is in contact with the sample.

2. The method of claim 1, wherein the uniform layer of the liquid polymerizable material on the substrate is created by one of:

driving a portion of the liquid polymerizable material from a syringe onto the substrate using an air or mechanical pump and translating the substrate towards and through a well-defined gap between rollers or knifes to create the uniform layer of the liquid polymerizable material with a thickness that is defined by the gap, a screen-printing module in which a screen or stencil of film with well-defined holes is coated with the liquid polymerizable material and a blade or a squeegee is used to transfer the liquid polymerizable material to the substrate in a soft or hard engage, a dispenser, an inkjet head, a gravure or micro-gravure system that coats the substrate with the uniform layer of the liquid polymerizable material, a slot-die system that coats the substrate with the uniform layer of the liquid polymerizable material, and a roller coating system that coats the substrate with the uniform layer of the liquid polymerizable material.

3. The method of claim 2, wherein the uniform layer of the liquid polymerizable material on the substrate is created inside a closed cell with a controlled environment.

4. The method of claim 2, wherein the printing and coating unit coats the substrate with more than one liquid polymerizable material.

5. The method of claim 1, wherein the printing and coating unit includes a gap between rollers or knifes to create the uniform layer of the liquid polymerizable material with a thickness that is defined by the gap, the method further comprising translating the substrate bidirectionally through the gap in a controlled manner while adjusting a width of the gap.

6. The method claim 2, wherein the liquid polymerizable material is a UV light curable material.

7. The method of claim 2, wherein the negative printing unit is a laser-based system that contains a laser, the method further comprising jetting the liquid polymerizable material from the substrate to a material reuse system using the laser.

8. The method of claim 2, wherein the substrate is one of: a continuous transparent film substrate, a transparent film substrate coated by a metal layer, or a transparent film substrate coated by a metal and a dielectric layer.

9. The method of claim 2, wherein the substrate is rolled to deliver the image printed at the negative printing unit to the sample building unit.

10. The method of claim 2, further comprising injecting support material to the sample at a support material addition unit.

* * * * *